(12) United States Patent
Hiltunen et al.

(10) Patent No.: US 9,204,306 B2
(45) Date of Patent: Dec. 1, 2015

(54) CELLULAR NETWORK RESOURCE CONTROL METHOD AND APPARATUS

(75) Inventors: Kimmo Juhani Hiltunen, Stockholm (FI); Bo Ove Hagerman, Tyresö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1832 days.

(21) Appl. No.: 11/783,749

(22) Filed: Apr. 11, 2007

(65) Prior Publication Data

US 2007/0249340 A1  Oct. 25, 2007

Related U.S. Application Data

(63) Continuation-in-part of application No. PCT/EP2005/055166, filed on Oct. 11, 2005.

(30) Foreign Application Priority Data

Oct. 20, 2004 (GB) .................................. 0423248.4

(51) Int. Cl.
*H04W 40/00* (2009.01)
*H04W 16/06* (2009.01)

(52) U.S. Cl.
CPC .................................... *H04W 16/06* (2013.01)

(58) Field of Classification Search
CPC ..... H04W 28/00; H04W 40/00; H04W 28/02; H04W 72/00; H04W 72/12; H04W 72/048; H04W 28/0231; H04W 36/00; H04W 36/0061; H04W 36/0066; H04W 16/00; H04W 36/04; H04W 16/10; H04W 16/06; H04W 36/08; H04Q 7/20; H04Q 3/66

USPC ........................ 455/446, 422.1, 466; 370/329
See application file for complete search history.

(56) References Cited

U.S. PATENT DOCUMENTS

| | | | |
|---|---|---|---|
| 5,309,503 A | * | 5/1994 | Bruckert et al. ........... 455/452.2 |
| 5,889,494 A | | 3/1999 | Reudink et al. |
| 6,282,425 B1 | | 8/2001 | Hottinen |

(Continued)

FOREIGN PATENT DOCUMENTS

| | | | |
|---|---|---|---|
| AU | 9166098 A | * | 3/1999 |
| EP | 0 797 369 A | | 9/1997 |

(Continued)

OTHER PUBLICATIONS

EP Search Report mailed Sep. 3, 2008 in corresponding EP application 08159297.4.

(Continued)

*Primary Examiner* — Meless Zewdu
(74) *Attorney, Agent, or Firm* — Nixon & Vanderhye, P.C.

(57) ABSTRACT

A cellular radio access network comprising a plurality of radio transceivers geographically spaced so that neighboring transceivers provide overlapping radio coverage for mobile user terminals, and a radio transceiver controller geographically spaced from and coupled to said plurality of radio transceivers, the controller being arranged to control each radio transceiver so that neighboring transceivers can be configured to communicate with user terminals using either the same or different radio channels, whereby the effective cell sizes of the radio access network can be dynamically increased or decreased depending upon the demands placed on the available radio resources.

18 Claims, 2 Drawing Sheets

(56) References Cited

U.S. PATENT DOCUMENTS

| | | |
|---|---|---|
| 6,310,871 B1 | 10/2001 | Kim |
| 6,795,689 B1 * | 9/2004 | Ogren et al. ............... 455/67.13 |
| 2002/0054580 A1 | 5/2002 | Strich et al. |
| 2002/0159431 A1 * | 10/2002 | Moulsley et al. ............. 370/347 |
| 2003/0043889 A1 * | 3/2003 | Kang et al. .................... 375/147 |
| 2003/0129984 A1 * | 7/2003 | Dent ............................. 455/446 |

FOREIGN PATENT DOCUMENTS

| | | |
|---|---|---|
| EP | 0 901 298 A | 3/1999 |
| EP | 1 271 982 A1 | 1/2003 |
| EP | 1 063 791 A3 | 8/2004 |
| GB | 2 350 024 A | 11/2000 |
| WO | 95/11577 | 4/1995 |
| WO | 02/91779 A | 11/2002 |
| WO | 03/013168 A1 | 2/2003 |

OTHER PUBLICATIONS

International Search Report for PCT/EP2005/055166 mailed Apr. 6, 2006.

Search Report under Section 17 for GB 0423248.4 dated Feb. 23, 2005.

* cited by examiner

CELLULAR NETWORK RESOURCE CONTROL METHOD AND APPARATUS

This application is a continuation-in-part application of international application PCT/EP2005/055166 filed 11 Oct. 2005, which designated the U.S. and claims priority to GB 0423248.4 filed 20 Oct. 2004, the entire content of each of which is hereby incorporated by reference.

FIELD OF THE INVENTION

The present invention relates to a cellular network resource control method and apparatus.

BACKGROUND

Typically, in a cellular radio telecommunications system such as GSM or UMTS, the whole system coverage area is divided into smaller sub-areas, termed "logical cells". In general, the logical cells are defined by the transmission of the downlink common channels: in the neighbouring logical cells the downlink common channels are typically transmitted on different frequencies and/or using different scrambling codes or with other types of identifiers.

Within each logical cell the amount of radio resources is usually limited. That is why, in order to serve a higher user density, the size of the logical cells has to be made smaller. Furthermore, since the system resources are also limited, for example the number of frequencies and the number of scrambling codes, the same frequencies or scrambling codes must be re-used (although only for cells which are spaced apart sufficiently to avoid cross-cell interference).

U.S. Pat. No. 5,889,494 teaches a system and method for dynamically sizing sectors of a multi-sectored radiation pattern used in a cellular telecommunication system.

SUMMARY

The great problem in the traditional cellular radio network implementation is the lack of adaptivity. In a network where the levels of user-related traffic can have relatively large dynamic variations, those high loaded parts of the network can easily become congested, while in low loaded areas the usage of the radio resources can be relatively inefficient. In the case of a static traffic distribution, a solution to geographically varying traffic levels would be to decrease the cell size at the high loaded areas. But with a traffic distribution which varies both geographically and with time, i.e. where the traffic "hot spots" are not constant, this kind of solution would not be particularly effective.

The technology disclosed herein overcomes or at least mitigate the above noted disadvantages of prior art cellular radio communication networks. This and other objects are achieved by providing a mechanism for dynamically increasing or decreasing cell size depending upon levels of demand.

According to a first aspect of the technology disclosed herein there is provided a cellular radio access network comprising:

a plurality of radio transceivers geographically spaced so that neighbouring transceivers provide overlapping radio coverage for mobile user terminals; and a radio transceiver controller geographically spaced from and coupled to said plurality of radio transceivers, the controller being arranged to control each radio transceiver so that neighbouring transceivers can be configured to communicate with user terminals using either the same or different radio channels, whereby the effective cell sizes of the radio access network can be dynamically increased or decreased depending upon the demands placed on the available radio resources.

Cell sizes may be increased or decreased by combining and/or splitting existing cells.

In one example embodiment, said access network is a UMTS Radio Access Network, said radio transceiver controller being provided by a Radio Network Controller and said radio transceivers being provides by Node Bs.

The radio transceiver controller may comprise signal processing means for processing radio signals received at the transceivers and sent to the controller, and for processing signals to be sent to the transceivers. The signal processing means is arranged to combine signals received from different transceivers and originating from a single user terminal.

The minimum functionality provided in a radio transceiver is a downlink power amplifier, a low noise amplifier for the uplink, and possibly some functionality for uplink measurements. The uplink and downlink signal processing requirements are implemented at the radio transceiver controller.

Said radio transceiver controller is arranged to manage individual calls ongoing at the time of a cell size change. This may involve handing over calls to a new channel, e.g. code or frequency or time, or maintaining ongoing calls on existing channels whilst setting up subsequent calls on new channels.

According to a second aspect of the present technology described herein there is provided a method of providing mobile user terminals with access to a cellular radio access network, the method comprising:

monitoring levels of demand for radio resources within individual cells of the radio access network; and;

increasing or decreasing the sizes of cells, including combining and/or splitting cells in response to the monitored demand levels.

According to a third aspect of the present technology described herein there is provided a method of providing mobile user terminals with access to a cellular radio access network, the method comprising:

defining logical cells each comprising a set of sub-areas, each sub-area containing a radio transceiver for communicating with user terminals, and the sub-areas of a logical cell sharing one or more sets of downlink control channels; and for each logical cell, dynamically allocating one or more sub-areas to each user terminal within that logical cell, the sub-areas allocated to each user transmitting and/or receiving the same information to/from the user.

According to a fourth aspect of the present technology described herein there is provided a radio transceiver controller comprising means for defining logical cells comprising a set of sub-areas, each sub-area containing a radio transceiver for communicating with user terminals, and the sub-areas of a logical cell sharing one or more sets of downlink control channels and, for each logical cell, dynamically allocating one or more sub-areas to each user terminal within that logical cell, the sub-areas allocated to each user transmitting and/or receiving the same information to/from the user.

According to a fifth aspect of the present technology described herein there is provided a method of providing mobile user terminals with access to a cellular radio access network, the method comprising:

for each of a plurality of carrier frequencies, defining logical cells each comprising a set of sub-areas, each sub-area containing a radio transceiver for communicating with user terminals, and the sub-areas of a logical cell sharing one or more sets of downlink control channels, whereby the geographical coverage of logical cells of different carrier frequencies overlap.

DETAILED DESCRIPTION OF CERTAIN EMBODIMENTS

Figure 1:
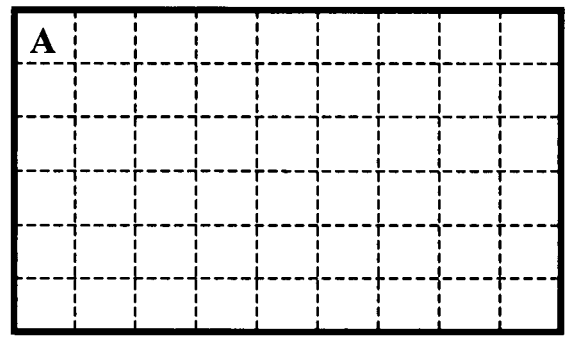
FIGS. 1 to 3 illustrate a system area of a radio access network sub-divided into sub-areas and configured into logical cells of respective different sizes.

As a solution to the problem of how to handle time-varying traffic levels in a radio access network, the size of the logical cells can be made dynamically flexible, so that they depend for example on the capacity required. The key assumption behind this solution is that the whole system area under consideration, as illustrated by the solid line in FIG. 1, is divided into a number of sub-areas "A" separated in the Figure by dashed lines, each one covered for example by a separate antenna lobe, passive antenna (or antenna system), or an active radio access port, see FIG. 1. As a simple example, the system area can be assumed to be a building within which cellular system coverage is desired.

Figure 2:
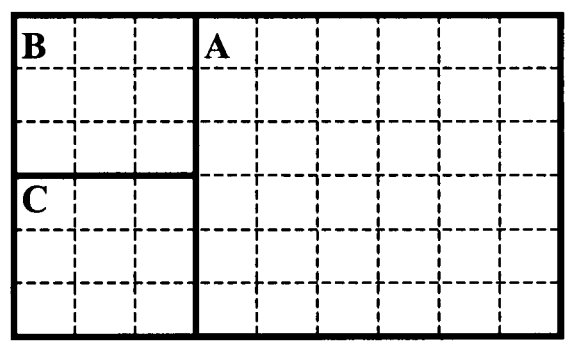

In a low loaded network, the size of the logical cells can be large. Thus, several sub-areas can be combined into one logical cell, for example by transmitting the same downlink control channels using the same scrambling code for all subareas. In such a case, a mobile user terminal perceives this combination of sub-areas as one logical cell. In the scenario illustrated in FIG. 2, a system area consists of three logical cells. Within the logical cell area, all sub-areas transmit the same cell-id information (e.g. scrambling code). In the case of a building, cells A, B and C would cover different parts of the building (floors).

Figure 3:
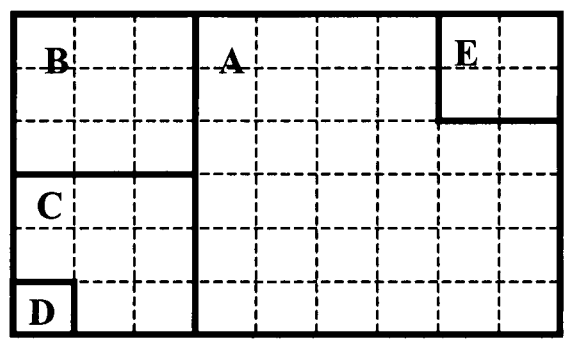

If the network notices that the radio resource capacity must be increased in some parts of the system area, it can split the current logical cells into smaller logical cells, for example by allocating a new set of downlink common channels on a new scrambling code and/or frequency (indicating a new cell identity). If the different sub-areas have a sufficient spatial separation, the network can decide to reuse an old frequency or scrambling code, instead of reserving a totally new one. FIG. 3 illustrates a reconfiguration of the system area to provide five logical cells. If the spatial separation between cells D and E is large enough, the same radio resources can be used in both. Conversely, a number of smaller logical cells can be merged into one larger cell, when the capacity can be reduced.

During the logical cell splitting or merging transition period, two sets of common channels must be transmitted within the overlapping sub-area, i.e. channels associated with the old cell(s) and channels associated with the new cell(s). This considerably increases the amount of downlink interference assuming that the same frequency is used both within the old and the new logical cell(s). Furthermore, the amount of resources available for the dedicated downlink channels is reduced. Therefore, the transition should preferably be performed during "off-peak" hours when traffic levels are low.

It will be appreciated that the solution presented here is also applicable to a partial merging/splitting (or shifting) of logical cells. In the case of such a partial merging/splitting, only a part of a logical cell, i.e. a sub-set of sub-areas, is merged into a neighbouring logical cell. In this way, the sizes of neighbouring logical cells can be dynamically adjusted based on the required radio resource capacity.

During a transition period, there are in principle two different ways to start up the new logical cell, or to close down the old logical cell:

1. Handover. The network orders the mobile terminals to switch from the old scrambling code (and/or frequency) to the new one. The downside of this solution is the increased signalling in the network. On the other hand, the transition period becomes quite short.
2. "Smooth transition". Old connections are kept as they are, whilst all new connections are set up towards the new logical cell. This approach keeps the network signalling load under control and/or at a minimum, although the downside is the possibly long transition period (i.e. the time taken for all ongoing connections to terminate).

Obviously, a combination of these two approaches is also possible.

Once a transition has been finalised, the old logical cell(s) can be switched off. However, if the new logical cell was created on a different carrier frequency, both the old and the new logical cells can co-exist if necessary. Thus, in such a scenario, a new frequency layer has been set up ("floating multi-layer structure"). This kind of deployment might be desirable if the high capacity sub-area includes both slow and fast moving mobiles. From a signalling point of view, it is more favourable to connect fast moving mobile terminals into the larger logical cell, while more stationary terminals located within the same service area could be connected to a smaller logical cell. With this kind of network deployment, the possible "near/far" and co-existence problems could be considerably reduced, since both frequency layers are now transmitted from the same physical node.

When looking at the network architecture, a central control node, a kind of a partial combination of the current UMTS Terrestrial Radio Access Network (UTRAN) Radio Network Controller (RNC) and Base Station (BS) is needed. This control node decides which small sub-areas are combined into the actual logical cell areas. In order to be able to make this decision, the control node needs some kind of information (measurement data) about the required capacity from the different sub-areas. This measurement data can consist of for example the average number of active links or the measured total uplink interference per radio unit, or the number of connection attempts.

A network operator may in some cases wish to connect users of a certain service, e.g. packet switched data transmission, to one logical cell whilst users of some other services, e.g. speech, are connected to a different logical cell. With the technology disclosed herein, this kind of action ("service-based splitting of logical cells") can be performed dynamically and in a simple fashion in the desired location within the system area covered by the sub-areas. However, as the users with different services are typically not geographically separated, the new logical cell cannot operate on the same frequency carrier as the original cell. Thus, the new logical cell has to be created on another frequency leading to a similar floating multi-layer structure as described above.

If a logical cell consists of multiple sub-areas, the logical cell can be treated as a "distributed antenna system". Since each sub-area is connected to a single centralized control node, several different communication methods become possible.

Figures 4, 5, 6:
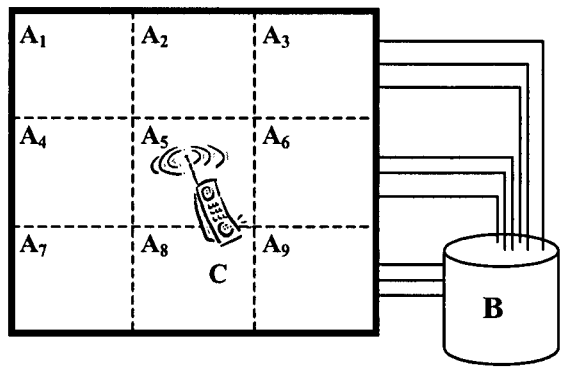
FIG. 4 illustrates a system area controlled by a system controller.
FIG. 5 illustrates a system area for the purpose of illustrating a soft-handover scenario.
FIG. 6 illustrates a system area for the purpose of illustrating mechanism for locally increasing network capacity.

Assume now that logical cell A consists of nine sub-areas ($A_1 \ldots A_9$), each of them individually connected to a central control node B, as is illustrated in FIG. 4. Assume also that a mobile C is located within the logical cell A. The same common channel information is transmitted within all nine sub-areas. However, it is not necessary to use all nine sub-areas for exchanging information relating to user C. In fact, using all sub-areas might in some cases result in a poorer performance than using only a limited set of sub-areas. Therefore, it is suggested that only the sub-areas that can really contribute to the overall signal quality are used to carry traffic to/from user C. Assuming that the uplink signal strength (RSCP) or the uplink quality (e.g. Carrier-to-Interference Ratio, CIR) can be measured separately for each sub-area and user, an appropriate sub-area selection can be made. A relative sub-area selection is assumed to be applied, which means that the sub-area which has the best measured uplink RSCP or CIR is always included in the set of active sub-areas. In addition, if other sub-areas can "hear" the same user with an RSCP or CIR which is close enough to the best measured RSCP or CIR, they are also included in the set of active sub-areas. The sub-area selection is changed dynamically throughout the active connection, and new sub-areas are added and old ones removed or replaced with new ones, depending on the actual uplink measurement results with minimum delay and at a minimum interference cost/impact.

In the downlink direction, the situation is similar to the traditional (UTRAN) multipath/macrodiversity combining, where a mobile terminal can track and resolve a number of signals with the help of the RAKE receiver (basically the question is about maximum ratio combining of the different paths coming from one or several logical cells, depending on the soft handover situation). Assuming that the different sub-areas are individually connected to the central control node, several combining methods, e.g. selection combining or maximum ratio combining, are applicable for the uplink direction. However, in the case of a soft handover situation between different control nodes, maximum ratio combining is most probably not possible for the uplink direction. Thus, for such situations, selection combining should be applied.

The maximum number of active sub-areas as well as the criteria (i.e. thresholds) for the sub-area addition, removal and replacement can vary from user to user, e.g. depending on the user speed and estimated propagation conditions (channel profile). Furthermore, the criteria can be different for the uplink and for the downlink resulting in different numbers of active sub-areas for each direction. The reason for this is that while macro diversity is in principle always favourable for the uplink, in the case of the downlink the overall macro diversity gain (similar to "soft handover gain") is a trade-off between the macro diversity combining gain and the loss due to the increased downlink interference. Therefore, the selection of the active sub-areas is not as sensitive for the uplink as it is for the downlink.

When the user is about to move from one logical cell to another, a handover is required. If the new logical cell is operating on the same frequency, a soft handover is possible. While the user is in soft handover, and in particular if the new cell is connected to the same control node as the old cell, the active sub-areas should be selected from the combined group of sub-areas (combined group consists of both the sub-areas belonging to the old cell and the sub-areas belonging to the new cell), see FIG. 5. In FIG. 5, the user (whose location is marked with a diamond) is assumed to be in soft handover between logical cells A and C. Now, the set of active sub-areas assigned for the user in question could consist of $\{A_{19}, A_{25}, C_3, C_6\}$ for the uplink, and $\{A_{19}, A_{25}, C_6\}$ for the downlink.

Finally, since the central control node has full control over all of the signals within the combined coverage area of the logical cells which are connected to it, the control node can apply special signal processing actions in order to improve the performance of the network. Possible actions include for example adding artificial delays between the different sub-areas within a logical cell in order to create artificial multi-paths, or attenuating all or only some of the signals transmitted within a certain sub-area, compared to the corresponding signals transmitted from other (possibly neighbouring) sub-areas. If the whole set of downlink signals or the set of downlink channels is attenuated, the coverage area of the corresponding sub-area can be modified. If only some individual dedicated downlink channels are attenuated (in particular towards users in soft handover), the downlink macro diversity gain could be slightly improved.

The above description assumes that the same dedicated information targeted towards a certain user is transmitted from all active sub-areas allocated to that user. Similarly, it has been assumed that the same dedicated information from a certain user is received at each of these active sub-areas. However, the technology disclosed herein also provides for transmitting different dedicated information in parallel from the active sub-areas, but still targeted towards the specific user. Furthermore, in the uplink direction, the user terminal can transmit multiple dedicated data streams in parallel, and these data streams can then be received at the different sub-areas. Traditionally, this kind of a transmission method has been called as "multi-stream MIMO (Multiple Input Multiple Output) transmission".

Due to the spatially separated transmit and receive antennas, multipath fading between the different transmit-receive antenna pairs becomes less correlated, reducing the interference between the data streams, and making possible the re-use of different kinds of radio resources, such as time, frequency and codes. As a result, bit rates and network capacity can be considerably increased compared to a single-stream transmission.

Transmission power must be divided between multiple parallel streams, and the multipath fading is not fully uncorrelated between the antennas, and so it is recognised that multi-stream transmission is favourable in scenarios where the obtainable SINR (Signal to Interference and Noise Ratio) is sufficiently large. The SINR is sufficiently large at locations that are not too far away from the serving base station. It is also apparent that this kind of intra-site antenna diversity does not provide any kind of additional diversity against shadow fading, which has typically the same value towards all co-located antennas. Therefore, the traditional "multi-stream MIMO transmission" cannot be seen as an efficient way to improve coverage.

The technology disclosed herein differs from the traditional method in the way the transmit/receive antennas are organized on the network side. Traditionally, the antennas are co-located at a site, but with a sufficient spatial separation (a number of wavelengths) between them. According to the technology disclosed herein, the antennas are not co-located, but are distributed in different sub-areas. This considerably increases the spatial separation between the antennas, and results in uncorrelated multipath fading, as well as considerably reducing correlated shadow fading. The use of "multi-stream transmission" becomes different. When the antennas are distributed in different sub-areas, multi-stream transmission is usable only when the obtainable quality (SINR) at the different sub-areas is sufficiently high, and also close enough from each other. Locations that are close to the borders between the different active sub-areas, but still close enough to the active radio transceivers provide these qualities. The technology disclosed herein allows "multi-stream transmission" to be used to improve the bit rates at the border areas between the active sub-areas.

Considering a WCDMA system, the number of orthogonal downlink codes (Orthogonal Variable Spreading Factor (OVSF) codes) associated with one scrambling code is limited. It is therefore possible to use several scrambling codes within one logical cell, and in that way make the system always "interference-limited". However, only one set of downlink common channels is transmitted within each logical cell on the primary scrambling code. The problem with multiple scrambling codes is that the links (OVSF codes) using the same scrambling code are orthogonal with each other, but links (OVSF codes) using different scrambling codes are not. Therefore, a user on the secondary scrambling code typically requires more downlink transmit power than a corresponding user on the primary scrambling code, in particular if the network applies an OVSF code allocation algorithm which aims to fully utilize the primary scrambling code before adding a secondary scrambling code into the logical cell. Now, with the help of the solution presented here, better control over the usage of the multiple scrambling codes can be accomplished.

Assume the example of FIG. 6 which illustrates a system area consisting of three logical cells. Logical cell A contains a traffic hot spot (hatched area; $A_{29}, A_{30}, A_{35}, A_{36}$). Now, if the central control node notices that the capacity required within the hotspot area increases and the downlink capacity within logical cell A is starting to be "code-limited", it can decide to split that area off into a new logical cell D, as explained above. However, as an alternative, in particular if the area in question is a relatively static traffic "hot spot" with relatively stationary users (e.g. an office building), the control node can as a first action add a secondary scrambling code or codes into the logical cell A. Furthermore, the users within the hot spot area should be allocated the primary scrambling code, i.e. the scrambling code where the downlink common channels are located, while users on the less loaded sub-areas could be allocated the secondary scrambling codes. By doing so, the cell/system capacity can be improved compared to the situation where a random allocation of scrambling codes (from the user location point of view) is applied.

When a user on a primary scrambling code moves out from a "hot spot area", no "code handover" is required. However, when a user on the secondary scrambling code enters the "hot spot area", a code handover may be required in order to avoid (or to relieve) any congestion. The obvious prerequisite is that there is enough room available on the primary scrambling code.

With the help of the solution described here, a flexible allocation of the downlink scrambling codes, downlink common control channels, and carrier frequencies over the whole system area becomes possible. For example, based on the actual traffic load, large logical cells can be split into smaller ones, or smaller logical cells can be merged into larger cells. In a similar fashion, new inter-frequency cell layers can be created at the wanted locations (i.e. the location area of carrier F2 can be assumed to be "floating" with respect to the location area of carrier F1). Finally, the allocation of multiple scrambling codes, or to be more exact, the allocation of codes for specific users within one logical cell, can also be based on the geographical traffic distribution.

Key features of the solution are:

The possibility to have full and dynamic control of the logical cell areas within the whole system area.

The (transition) procedure when starting up a new logical cell within an old logical cell area (cell splitting), or when closing down a logical cell (cell merging).

Flexible generation of a floating multilayer structure (macro-macro, macro-micro, macro-indoor, micro-indoor etc.), assuming that the new logical cell is operating on a different frequency from the old one. Both frequencies are transmitted via the same radio units so that the lower layer with smaller coverage area will use a sub-set of the radio units allocated for the higher layer with a larger coverage area.

The dynamic selection of active sub-areas (for each user), which is based on the relative uplink RSCP or CIR measurements. These measurements will be performed by the network (at each radio unit or possibly at the control node).

The dynamic selection of active sub-areas (for each user), which is based on the estimated user speed.

The dynamic selection of active sub-areas (for each user), which is based on the estimated propagation conditions (channel profile).

Different active sub-area selection criteria for the uplink and the downlink, and, as a result, partially different sets of active sub-areas for the uplink and the downlink.

When the user is in soft handover between two or more logical cells belonging to the same control node, the active sub-areas are selected from the combined group of sub-areas.

Allocation of users on different scrambling codes within a logical cell depending on the location of the user with respect to the locations of the other users (location of the traffic in average).

It will be appreciated by the person of skill in the art that various modifications may be made to the above described embodiments without departing from the scope of the present invention.

The invention claimed is:

1. A method of providing mobile user terminals with access to a cellular radio access network, the method comprising:
within the cellular radio access network at a radio transceiver controller:
defining logical cells each comprising a set of sub-areas, each sub-area comprising a separate radio transceiver for communicating with user terminals, and the sub-areas of a logical cell within the logical cells sharing one or more sets of downlink common control channels; and
for each logical cell within the logical cells, dynamically allocating one or more sub-areas of the set to each user terminal, in said user terminals, within that logical cell, the sub-areas allocated to said each user terminal transmitting and/or receiving the same dedicated information to/from the user terminal; and
defining a user terminal, within said user terminals, an active set of logical cells, within the defined logical cells, to which the user is connected, and wherein the dynamcally allocating the one or more sub-areas to said each user terminal comprises allocating the sub-areas from a combined group of the local cells within the active set.

2. The method according to claim 1, wherein the sub-areas are allocated the user terminals on the basis of received uplink signal strengths for terminals for sub-areas.

3. The method according to claim 1, where the sub-areas are allocated the user terminals on the basis of measured or estimated uplink quality.

4. The method according to claim 1, wherein the sub-areas are allocated the user terminals on the basis of measured or estimated uplink quality and said uplink quality is the Carrier-to-Interference Ratio per sub-area per user terminal.

5. The method according to claim 1, wherein said logical cells are dynamically configurable in terms of the sub-areas that they contain.

6. The method according to claim 1, wherein said radio access network is a CDMA network.

7. The method according to claim 6, further comprising identifying hot-spots within a given logical cell, and allocating a primary scrambling code to user terminals within the hotspots and secondary scrambling codes to terminals outside the hotspots.

8. The method according to claim 1, further comprising allocating sub-areas to a user terminal in dependence upon the speed of travel of the user terminal and/or radio propagation conditions.

9. The method according to claim 1, wherein dynamically allocating the one or more sub-areas to said each user terminal comprises allocating the sub-areas to user terminals in dependence upon the service required by a user terminal.

10. The method according to claim 1, wherein dynamically allocating one or more sub-areas to each user terminal comprises allocating different sets of sub-areas for the uplink and downlink directions.

11. The method according to claim 1, further comprising sending said dedicated information on one or more dedicated channels.

12. The method according to claim 1; further comprising:
using the radio transceiver controller to define the logical cells;
using the radio transceiver controller to dynamically allocate the one or more sub-areas to said each user terminal within that logical cell; and
using the radio transceiver controller to define for a user terminal of said user terminals the active set of the logical cells to which the user is connected.

13. A cellular radio access network comprising:
a radio transceiver controller;
a plurality of radio transceivers;
a plurality of logical cells each comprising a set of sub-areas, each sub-area comprising a separate radio transceiver for communicating with user terminals, and the sub-areas of a logical cell sharing one or more sets of downlink common control channels;
for each logical cell, within the plurality of logical cells, the radio transceiver controller being arranged to dynamically allocating one or more sub-areas, in the set of sub-areas, to each user of said user terminals within that logical cell, the sub-areas allocated to said each user transmitting and/or receiving the same dedicated information to/from the user;
wherein a user terminal of said user terminals is connected to an active set of said logical cells and said dynamic allocation comprises allocating the sub-areas from a combined group of the logical cells within the active set.

14. A method of providing mobile user terminals with access to a cellular radio access network, the method comprising:
within the cellular radio access network at a radio transceiver controller:
defining logical cells each comprising a set of sub-areas, each sub-area of the set of sub-areas comprising a separate radio transceiver for communicating with user terminals, and the the sub-areas of the logical cells sharing one or more sets of downlink common control channels; and
for each of said logical cells, dynamically allocating one or more sub-areas of said set to each of said user terminals within that logical cell, the sub-areas allocated to each user terminal transmitting and/or receiving different dedicated information to/from the user terminal;
defining for a user terminal of said user terminals an active set of logical cells, within said defined logical cells, to which the user is connected, and wherein the dynamically allocating the one or more sub-areas to said each user terminal comprises allocating the sub-areas from a combined group of the logical cells within the active set.

15. The method according to claim 14, further comprising said each sub-area allocated to said each user terminal transmitting the dedicated information to the user terminal over a different dedicated downlink channel.

16. The method according to claim 14, further comprising:
using the radio transceiver controller to define the logical cells;
using the radio transceiver controller to dynamically allocate the one or more sub-areas to said each user terminal within that logical cell; and
using the radio transceiver controller to define for a user terminal of said user terminals the active set of the logical cells to which the user is connected.

17. A cellular radio access network comprising:
a radio transceiver controller;
a plurality of radio transceivers;
a plurality of logical cells each comprising a set of sub-areas, each sub-area of the set containing a separate radio transceiver for communicating with user terminals, and the sub-areas of a logical cell, within the plurality of logical cells, sharing one or more sets of downlink common control channels and, for each of said logical cells, the radio transceiver controller being arranged to dynamically allocate the one or more sub-areas to each of said user terminals within that logical cell, the sub-areas allocate to said each user transmitting and/or receiving different dedicated information to/from the user;
wherein a user terminal, of said user terminals, is connected to an active set of said logical cells and said dynamic allocation comprises allocating the sub-areas from a combined group of the logical cells within the active set.

18. The radio transceiver controller according to claim 17, wherein said radio transceiver controller is arranged to cause the allocated sub-areas to transmit the different dedicated information to the user terminals over respective dedicated downlink channels.

* * * * *

UNITED STATES PATENT AND TRADEMARK OFFICE
CERTIFICATE OF CORRECTION

| | | |
|---|---|---|
| PATENT NO. | : 9,204,306 B2 | Page 1 of 1 |
| APPLICATION NO. | : 11/783749 | |
| DATED | : December 1, 2015 | |
| INVENTOR(S) | : Hiltunen et al. | |

It is certified that error appears in the above-identified patent and that said Letters Patent is hereby corrected as shown below:

On the title page item 75, under "Inventors", in Column 1, Lines 1-2, delete "Stockholm (FI);" and insert -- Stockholm (SE); --, therefor.

In the claims

In Column 8, Line 58, in Claim 1, delete "dynamcally" and insert -- dynamically --, therefor.

In Column 8, Line 60, in Claim 1, delete "local" and insert -- logical --, therefor.

In Column 8, Line 65, in Claim 1, delete "where" and insert -- wherein --, therefor.

In Column 9, Line 30, in Claim 12, delete "claim 1;" and insert -- claim 1, --, therefor.

In Column 10, Line 6, in Claim 14, delete "and the the" and insert -- and the --, therefor.

In Column 10, Line 47, in Claim 17, delete "allocate" and insert -- allocated --, therefor.

Signed and Sealed this
Nineteenth Day of April, 2016

Michelle K. Lee
*Director of the United States Patent and Trademark Office*